United States Patent [19]

Froutzis et al.

[11] Patent Number: 4,595,164
[45] Date of Patent: Jun. 17, 1986

[54] MEANS FOR REMOVABLY ANCHORING VEHICLE SEATS

[76] Inventors: Andrew Froutzis; George Prathaftakis, both of 53224 Marina Dr., Elkhart, Ind. 46515

[21] Appl. No.: 672,896

[22] Filed: Nov. 16, 1984

[51] Int. Cl.⁴ .............................................. F16M 13/00
[52] U.S. Cl. .................................... 248/429; 248/74.4; 248/503.1
[58] Field of Search ............... 248/429, 500, 501, 502, 248/503, 503.1, 297.2, 316.1, 74.1, 74.4, 74.5; 211/167, 94

[56] References Cited

U.S. PATENT DOCUMENTS

| | | | |
|---|---|---|---|
| 1,198,840 | 9/1916 | Hanck et al. | 248/316.1 |
| 1,947,165 | 2/1934 | Nelke | 248/297.2 X |
| 2,066,557 | 1/1937 | Cox | 248/429 |

FOREIGN PATENT DOCUMENTS

| | | | |
|---|---|---|---|
| 373278 | 7/1939 | Italy | 248/429 |
| 289197 | 4/1928 | United Kingdom | 248/429 |
| 421905 | 1/1935 | United Kingdom | 248/429 |
| 434983 | 9/1935 | United Kingdom | 248/429 |
| 437562 | 10/1935 | United Kingdom | 248/429 |
| 465360 | 5/1937 | United Kingdom | 248/429 |

Primary Examiner—J. Franklin Foss
Assistant Examiner—David L. Talbott
Attorney, Agent, or Firm—Eugene C. Knoblock

[57] ABSTRACT

A device for anchoring to the floor of a vehicle a seat having a pair of U-shaped supports, wherein channels to receive said seat supports are anchored to the vehicle floor and a pair of anchors interlock with said channels and apply anchoring pressure to said seat supports.

6 Claims, 3 Drawing Figures

U.S. Patent  Jun. 17, 1986  4,595,164
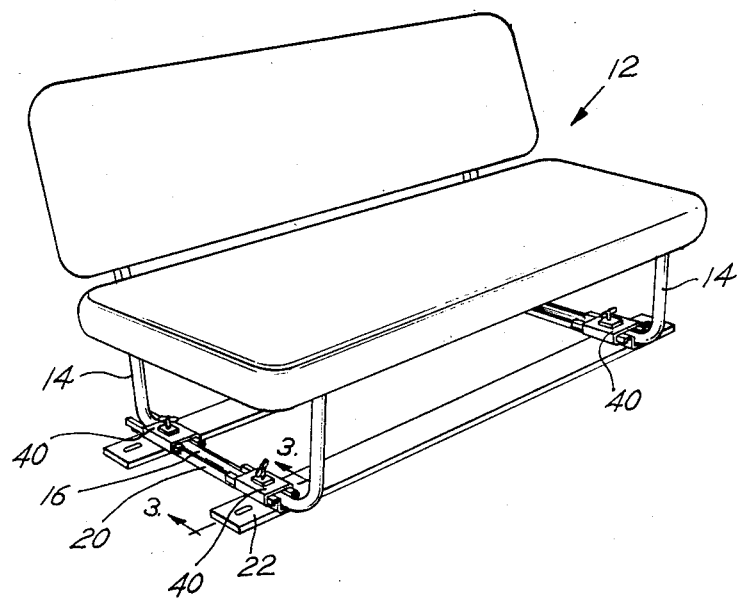
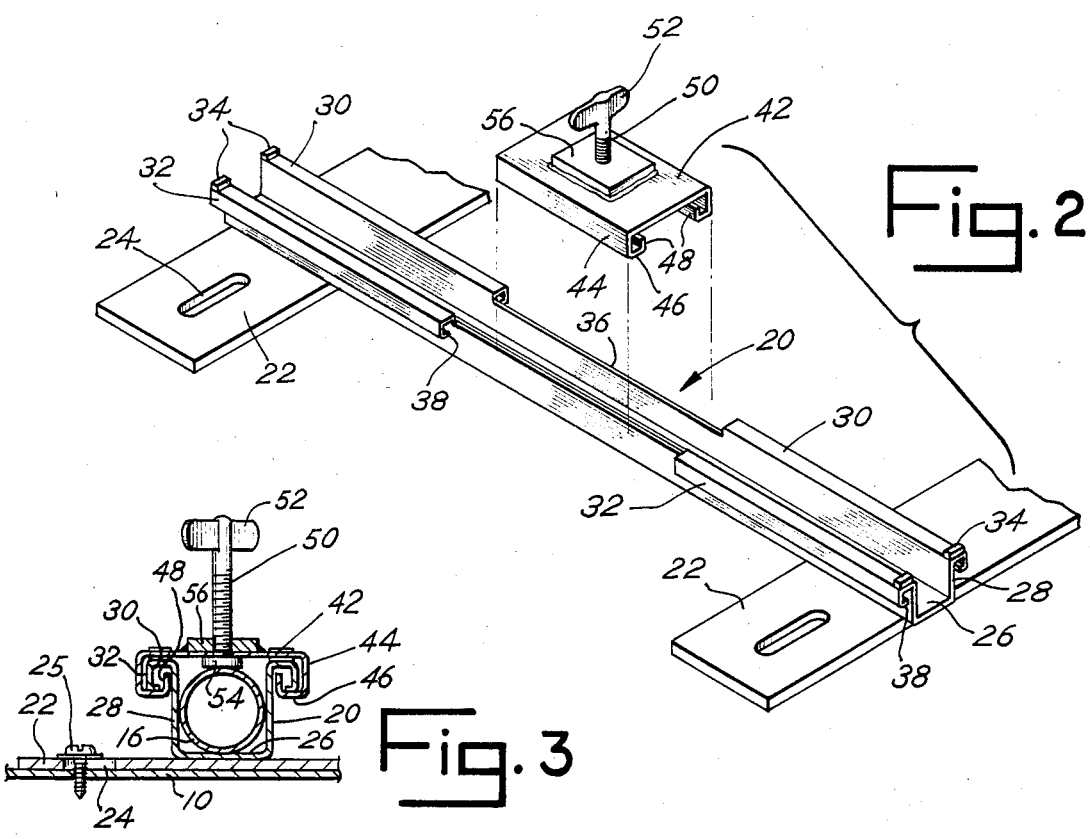

MEANS FOR REMOVABLY ANCHORING VEHICLE SEATS

SUMMARY OF THE INVENTION

This invention relates to means for removably anchoring vehicle seats. More particularly, it is designed for installation in motor vehicles, such as vans which are intended for conversion between passenger travel and cargo hauling purposes.

Usage of a vehicle for the purpose of hauling cargo requires that rear passenger seats be removed from the vehicle and minimum obstruction to the loading and unloading of cargo be present after the seat removed. The use of the vehicle for purposes of carrying passengers requires the provision of means accommodating rapid and easy installation and removal of the seats and anchorage of the seat in selected position in a manner to withstand and prevent movement incident to braking and acceleration of the vehicle.

It is the primary object of this invention to provide means for anchoring a seat in a vehicle which is simple in construction, inexpensive, and easy to use upon applying a seat and when removing a seat.

A further object is to provide a device of this character which has means mounted permanently in a vehicle for cooperation with a seat and seat securing means and which is of a nature to provide minimum obstruction to the loading and unloading of cargo when a seat is removed from the vehicle.

A further object is to provide a device of this character which accommodates adjustment of the point of anchorage of a seat in a vehicle and which is operable without requiring tools.

Other objects will become apparent from the following specifications.

DESCRIPTION OF THE DRAWINGS

FIG. 1 is a perspective view of a seat secured by the anchor means.

FIG. 2 is a perspective view of the anchor means.

FIG. 3 is a sectional view taken on line 3—3 of FIG. 1.

DESCRIPTION OF THE PREFERRED EMBODIMENT

Referring to the drawing which illustrates a preferred embodiment of the invention, the numeral 10 designates the floor of the vehicle such as a van upon which a seat 12 is to be supported removably. The seat 12 may be of any desired construction and preferably includes a base having two or more substantially U-shaped supports 14, each including a bottom member 16 such as a metal tube.

A pair of channel members 20, generally U-shaped, are secured to the floor of the vehicle in parallel relation spaced similarly to the spacing of the seat supports 14 at the area of the vehicle floor at which seat 12 is to be installed. Members 20 are secured in fixed position by any suitable means such as flanges or projections 22 having apertures 24 to receive bolts, rivets or other securing means 25. Each channel member 20 has a base portion 26 from opposite margins of which project upwardly channel side walls 28 spaced apart to receive the seat bottom tube 16 therebetween. Outturned flanges 30 project laterally from the upper free ends of the side walls of the channel and terminate in downturned flanges 32. At the outer ends of each of the outturned flanges 30 is provided an upturned stop or abutment 34. The length of each channel 20 is preferably greater than the length of the bottom tube 16 of the seat support. At the mid portion 36 of each channel, preferably for a length of 4–6 inches, the outturned flanges 30 and downturned flanges 32 of the channels are eliminated so that said mid part 36 constitutes a simple channel whose side walls preferably do not substantially exceed the height of the remaining portions of the channel side walls 28.

The device utilizes a pair of adjustable retainers 40. Each retainer 40 comprises a relatively short length of an inverted channel having a top wall 42 of a width slightly greater than the lateral spacing of the downturned flanges 32 of channel 20. Side walls 44 project downwardly from opposite margins of the top wall 42 and are of a vertical dimension slightly greater than the vertical dimension of the downturned flanges 32 of the channel 20. Each channel side wall 44 terminates in a U-shaped inwardly projecting hook portion characterized by an inturned flange 46 and an upturned flange 48. Flanges 48 are spaced apart a distance greater than the spacing of the side walls 28 of channel 20 and less than the spacing of the downturned flanges 32 of the channel 20. The upturned flanges 48 may be slightly greater than the vertical dimension of the downturned flanges 32 of the channel 20.

An aperture is formed in the central portion of the top wall 42 of the adjustable retainer 40 to receive rotatably the threaded shank 50 of a set screw having laterally projecting manually engageable ears 52 at one end and mounting a tube abutment member 54 at its opposite end. A reinforcing member 56 is welded or otherwise suitably secured to the uppermost surface of the top wall 42 of the adjustable retainer and has provided therein a screw-threaded bore registering with the channel opening receiving the screw shank 50 and having screw threads complementary to those on the screw shank 50.

The length of each adjustable retainer 40 is less than the length of the mid part 36 of the fixed U-shaped channel 20 so that the adjustable retainer 40 may be applied to and removed from the fixed U-shaped channel 20 when the retainer is positioned in register with the mid part 36 of the fixed channel 20.

In the use of the anchoring device, assuming that the channels 20 are properly anchored to the floor in position to receive the bottom tubes of the U-shaped supports 14 of a seat, the device is ready for use. To install a seat, the seat is positioned with the bottom tubes 16 of its supports located within the fixed U-shaped channels 20 at selected desired position along the length of the fixed U-shaped channels 20. The adjustable retainers 40 are then applied to the fixed U-shaped channel 20 at the mid part 36 thereof and are slid along the fixed U-shaped channels to selected positions at which parts of the U-shaped members 46–48 of the retainers are received between the side walls 28 and the downturned flanges 32 of the U-shaped channels 20. The abutments 34 of the U-shaped channel limit the extent to which the adjustable retainers 40 may be moved along the fixed U-shaped channels 20 relative to the mid parts 36 of the channels 20. When the bottom tube 16 of the base of the seat 12 is properly positioned within the fixed U-shaped channels 20 and the adjustable retainers 40 are positioned in interlocking or interfitting relation to the flanges of the fixed channels 20, the set screw shank 50 may be rotated in the reinforcing members 56 of the retainer 40 by means of the screw ears 52 to an extent sufficient to interlock the U-shaped members 46–48 of the adjustable retainer with the outturned flanges 30 of the fixed channels 20 while the screw abutments 54 press downwardly upon the tube 16 of the seat support with sufficient firmness of frictional engagement of the parts to hold the seat firmly in selected position and against longitudinal movement of the seat bottom tubes 16 in the fixed channels 20. The desired firmness of frictional anchorage can be secured by simple manual manipulation of the screw through the lateral screw ears 52. The firmness of anchorage will be sufficient to resist displacement of the seat from selected position in normal use and during travel of the vehicle while passengers are carried by the seat under normal operating conditions, as during vehicle acceleration or vehicle braking which otherwise would tend to produce movement of the seat relative to the fixed channels. It will be understood that the parts of the fixed channel and the retainer are formed of rigid material such as strong metal of a gage sufficient to withstand stresses which would be applied thereto in use. Also, if desired, the free lower marginal portions of the downturned flanges of the fixed channel 20 may be rigidified as by the provision of narrow inturned or outturned flanges 38. Also, it will be understood that the reinforcing members 56 of the adjustable retainers will be of such character as to rigidify and strengthen the top retainer walls 42 against deformation incident to tightening of said screws 50 to effect firm frictional engagement of the abutment members 54 with the bottom tube 16 of the seat support.

Release of the seat for purposes of adjustment of its position or for removal from the vehicle can be accomplished manually without requiring the use of tools by manipulating the ears 52 of the set screws to release the frictional engagement of the retainers with the fixed channels sufficiently to permit removal of the retainers from the fixed channels.

While the preferred embodiment of the invention has been illustrated and described, it will be understood that changes in the device may be made within the scope of the claims without departing from the spirits of the invention.

We claim:

1. A device for anchoring to the floor of a vehicle a seat having a support with a pair of horizontal lower parts comprising a pair of channels secured to the floor of a vehicle in position to receive said lower seat support parts, each channel having upper outturned marginal flanges terminating in downturned portions, a pair of anchor members carried by each fixed channel at opposite ends thereof and each having a transverse part spanning said fixed channel and having marginal hook flanges each projecting downwardly and inwardly relative to a marginal flange of said fixed channel, and an adjustment screw threaded in each transverse anchor part to bear on and anchor a lower seat support part and releasably interlock the hook flanges of said anchor with the flanges of said fixed channel.

2. A device as defined in claim 1, wherein the flanges of said fixed channels are interrupted at the central part of each fixed channel and each anchor is shorter than the interruption of said fixed channel flanges.

3. A device as defined in claim 2, wherein anchor-engageable stop members project from each end of said fixed channel.

4. A device for anchoring to the floor of a vehicle a seat having a support with a pair of horizontal lower parts comprising a pair of channels secured to the floor of a vehicle to receive said lower seat support parts, a pair of anchors removably carried by the opposite ends of each fixed channel, complementary interengaging parts carried by each fixed channel and anchor, and a screw threaded in each anchor to engage a seat support part positioned in a fixed channel and to shift said anchor into interlocking engagement with said channel at said interengaging parts.

5. A device as defined in claim 4 wherein the anchor-interengaging parts of each channel are located at the ends thereof and are spaced longitudinally a distance greater than the length of an anchor.

6. A device as defined in claim 5, and stop means carried by the ends of each channel to limit endwise outward position of an adjacent anchor on said channel.

* * * * *